Jan. 27, 1970   H. W. VIKER ET AL   3,491,877
PRESSURE-SENSITIVE ADHESIVE TAPE
Filed March 17, 1966

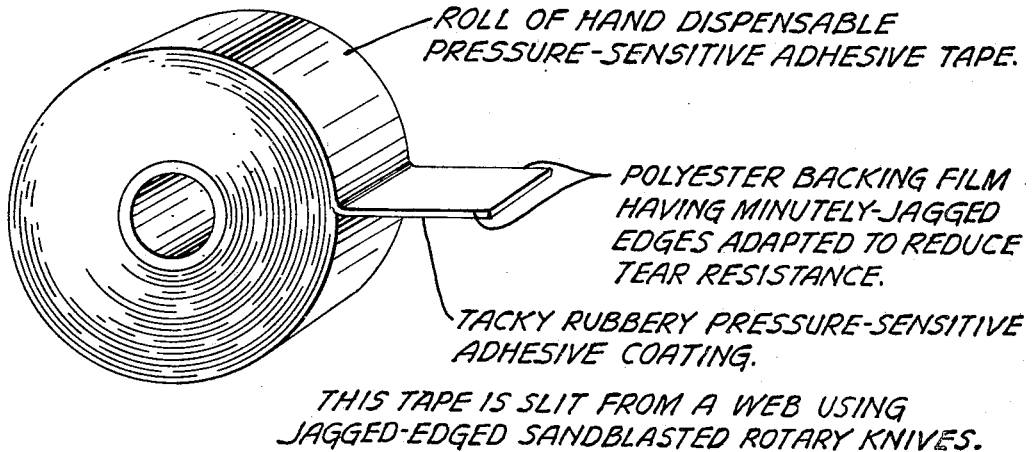

FIG. 1
- ROLL OF HAND DISPENSABLE PRESSURE-SENSITIVE ADHESIVE TAPE.
- POLYESTER BACKING FILM HAVING MINUTELY-JAGGED EDGES ADAPTED TO REDUCE TEAR RESISTANCE.
- TACKY RUBBERY PRESSURE-SENSITIVE ADHESIVE COATING.

THIS TAPE IS SLIT FROM A WEB USING JAGGED-EDGED SANDBLASTED ROTARY KNIVES.

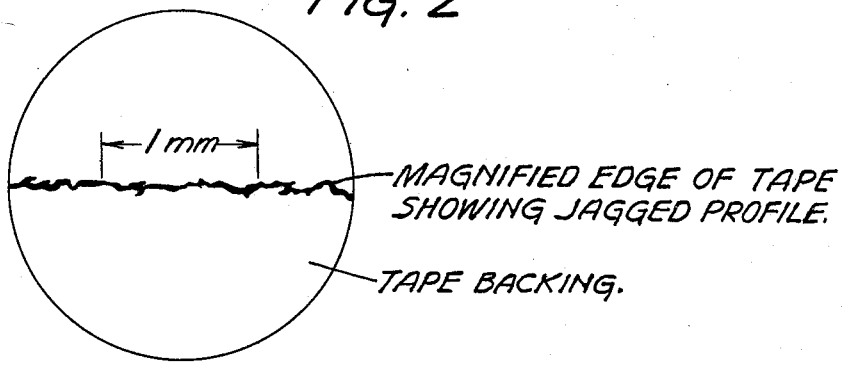

FIG. 2
- MAGNIFIED EDGE OF TAPE SHOWING JAGGED PROFILE.
- TAPE BACKING.

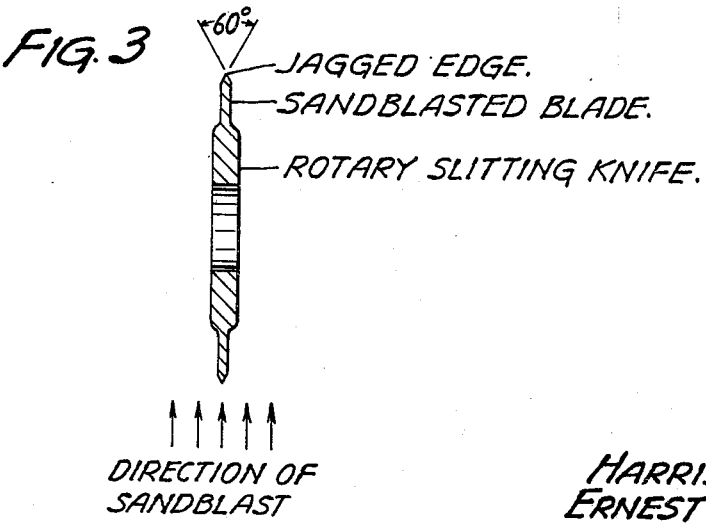

FIG. 3
- JAGGED EDGE.
- SANDBLASTED BLADE.
- ROTARY SLITTING KNIFE.

DIRECTION OF SANDBLAST

INVENTORS
HARRIS W. VIKER
ERNEST O. ANDERSON
BY Carpenter, Kinney & Coulter
ATTORNEYS

United States Patent Office 3,491,877
Patented Jan. 27, 1970

3,491,877
PRESSURE-SENSITIVE ADHESIVE TAPE
Harris W. Viker and Ernest O. Anderson, St. Paul, Minn., assignors to Minnesota Mining and Manufacturing Company, St. Paul, Minn., a corporation of Delaware
Filed Mar. 17, 1966, Ser. No. 535,186
Int. Cl. B65b 55/00, 75/02; B65d 85/04, 85/66
U.S. Cl. 206—59
3 Claims

ABSTRACT OF THE DISCLOSURE

Rolls of tacky pressure-sensitive adhesive tape having a tough high-tensile semi-rigid type of film backing (such as a polyester film) are rendered finger-tearable and hand dispensable by making use of sandblasted rotary slitting knives to form inconspicuous continuously microjagged film edges (instead of the customary smooth-slitted edges) which do not materially alter the appearance and utility of the tape. A workman can carry a roll of such adhesive tape and easily remove a piece of any desired length without need of a dispenser or cutter.

DESCRIPTION OF THE INVENTION

This invention relates to pressure-sensitive adhesive tape wound in roll form and which has a type of semi-rigid film backing (e.g. a polyester film) which is ordinarily so tough and tear-resistant that it is difficult or impossible for most persons to properly sever a piece of tape by a mere hand or finger tearing action. In accordance with this invention such tape is rendered hand dispensable, by being provided with inconspicuous continuously minutely-jagged (microjagged) film edges such that finger tearing is made easy, without, however, materially impairing the appearance or utility of the tape. The invention provides a novel slitting procedure and means whereby the novel tape can be economically manufactured using existing equipment.

The invention is concisely disclosed in the accompanying schematic drawing having explanatory legends, wherein: FIGURE 1 shows a roll of pressure-sensitive adhesive tape having a semi-rigid film backing (such as polyester film) coated with tacky rubbery pressure-sensitive adhesive. It is rendered hand dispensable by the provision of minutely-jagged film edges adapted to reduce tear resistance. FIGURE 2 shows a magnified edge view of the tape, looking down upon an edge of the film backing, to illustrate the nature of the jagged edge profile (a 1 millimeter scale indicia is included so that the dimensional magnitude of the edge roughness can be better appreciated). FIGURE 3 is a sectional edge view of a conventional rotary slitting knife (as employed in a slitting machine wherein the knife bears against a score roll) which has been modified by sandblasting the blade so as to form a grid-abraded minutely-jagged severing edge adapted to produce the above-mentioned continuously jagged film edges when an adhesive coated film web is slit in making tape. These minutely-jagged edges may aptly be referred to as "micro-jagged" both as regards slitting-knife edges and tape edges.

Rolls of aggressively-tacky pressure-sensitive adhesive tape having a polyester film backing (or other such semi-rigid film backing) have conventionally been manufactured from a continuous web or "jumbo" roll of adhesive-coated film sheeting by means of a slitting machine (such as a "Cameron" slitter) wherein the web is slit into a multiplicity of tapes which are then wound up on cylindrical cores so as to provide tapes of desired width and length in convenient roll form. Slitting is commonly performed by a gang of rotary slitting knives on a cross-bar which bear against a driven score roll of hardened steel, the web being slit by being drawn through the nip with the non-tacky film back side in contact with the score roll. Narrow tapes require the use of two or more slitter gangs in series, the knives thereof being staggered, because the spacing between adjacent knife edges cannot be reduced beyond a certain width. The rotating knives penetrate the adhesive coating before reaching and slitting the film. This tacky rubbery type of adhesive is viscoelastic and stretchy. Since it is the composite of film and sticky-rubbery adhesive coating that is subjected to slitting, the coaction to the slitting knife and score roll is different than in the case of a plain film.

Conventional slitting with conventional sharp slitting knives results in adhesive tapes having relatively smooth edges. This has always been regarded as desirable in commercial manufacturing operations. When knives become dulled they are incapable of properly severing the adhesive-coated film web at the speeds required in commercial tape production and must be sharpened. Such dull knives cannot provide a controlled and adequate reduction of tear resistance necessary to hand dispensability.

Pressure-sensitive polyester film tapes are very strong and tough, as compared to the well-known older tapes having cellulosic film backings, and, for this and other reasons, these tapes have become popular for a variety of usages.

By "polyester film" in tape art terminology is meant a tensilized (oriented) film of a polymer of an ester of ethylene glycol and terephthalic acid or equivalent ester polymer or copolymer which is useful as a backing for strong aggressively-tacky adhesive tapes. The film may have been tensilized (stretched) in only the machine direction, or may have been biaxially tensilized by also having been stretched in the crosswise direction. Typical tapes having such polyester film backings and used for holding, packaging, fastening and mending purposes utilize backing films having thicknesses in the range of about 1 to 2 mils (about 25 to 50 microns).

These film backings are "semi-rigid" since tapes elongate under moderate to strong finger pulling and ordinarily this makes finger tearing difficult or impossible without mutilating the tape. They are sufficiently rigid and tearable for cross tearing to be readily continued once it has been initiated at an edge. (These films thus differ from highly plasticized films which are too soft and stretchy to be rendered finger tearable by the technique of the present invention.) As is well known in the film art, the terms "rigid" and "semi-rigid" refer to tentional stiffness in the plane of the film and do not connote any lack of flexibility. Tape backing films are highly flexible.

A serious disadvantage of such polyester film-backed adhesive tapes is the lack of effective hand dispensability. A so-called "hand dispensable" tape is one that permits a worker to carry about a roll of the tape without any dispenser, and whenever he needs a piece of tape he unwinds some tape from the roll and then tears off the desired length by a finger pulling or jerking action, thus obviating the need of any tool, knife or scissors. Persons of less than average strength and dexterity and experience should be able to readily tear the tape. Hand dispensing should be possible without the tape being distorted or mutilated in the process.

Attempts have been made to achieve hand dispensability of pressure-sensitive polyester film tapes by choice of a film of such composition and molecular structure that tearability is enhanced. However, this approach puts a limitation on choice of tape films which is undesirable as regards technical and economic factors. Moreover, the problem is not solved by merely increasing the tearability which a film has after a tear has been started. There is still the problem of initiating a tear.

In our work we have found that the key to making pressure-sensitive polyester film tapes "hand dispensable" is to provide a type of edge that enables a cross tear to be readily initiated by finger action when and where desired.

We have made the surprising discovery that it is possible to employ conventional slitters using modified conventional rotary slitting knives rendered capable of slitting the adhesive-coated polyester film web in such a way that the edges of the adhesive tape readily permit the initiation of cross-tearing. We have found that the edges of sharp knives can be sandblasted with abrasive grits so as to render them minutely jagged but still effective for slitting. These grit-abraded jagged edges cause continuously microjagged edges to be formed in the polyester film during slitting (thus see FIG. 2), in contrast to the smooth edges that would otherwise be formed. The jaggedness of the edges is so minute as to be inconspicuous. The microjagged knife edge (which is not sharp as is a conventional slitting knife edge) exerts a fracturing effect in penetrating and severing the film. The resultant adhesive tapes are hand dispensable. Yet the tape edges do not have an objectionable degree of roughness interfering unduly with the appearance and desired handling properties of the tape. Finger tearability is achieved without substantial impairment of the tensile strength of the tape.

The elongation at break is markedly reduced but will still be in the range of 12 to 20% for 1 mil thick polyester film (which has an elongation of over 50% when the tape is smooth-edged). Thus the tape is rendered hand dispensable from the roll although still usefully strong.

Surprisingly, these jagged-edged knives can slit about twice as much tape before resharpening is required than is true of corresponding smooth-edged knives. The resultant reduction in slitter "down time" and in labor costs is an economically important side benefit.

Slitting knives have been employed to simultaneously lubricate or plasticize the edges of tapes during slitting, using one or more felt wicks rubbing against the rotating knives and dipping into a bath of the treating solution. The present microjagged-edged slitting knives likewise permit of this convenient expedient. This procedure can also be used to apply an antistatic edge-coating to one or both edges of the tapes as they are slit. An example is a solution in a volatile vehicle of a soft plastic or waxy water-soluble quaternary ammonium compound which is capable of providing adequate ionic antistatic conductivity. Such antistatic coating compositions are commercially available. This solution is wiped off on the tape edges and dries by the time the tape is wound in a roll. Pressure-sensitive polyester film tapes are static prone and a piece unwound from a roll and severed may have an objectionable electrical charge. Thus it is an important feature of the present invention that the novel slitting procedure and resultant microjagged-edged tapes do not preclude the application of useful antistatic edge coatings as an integral part of the slitting operation. In fact it has been found that antistatic edge coatings of about double the normal mass and conductivity per unit length can be provided, thereby rendering the polyester tape products even less prone to static effects. Pressure-sensitive static-prone adhesive tapes provided with antistatic edge coatings are described and claimed in the copending application of Rabuse, Wallner and Sterling, S.N. 399,431, filed Sept. 28,1964, now U.S. Patent No. 3,347,362.

Another important advantage of jagged-edged adhesive tapes that are slit in accordance with this invention is that rolls of tape can be directly stacked without use of separators in multiple roll packaging. Even prolonged contact between the sides of contiguous rolls does not result in blocking together such as to prevent or seriously resist subsequent separation, as is true in the case of rolls of smooth-edged tape which has been slit in a conventional manner. The sides of the present tape rolls are minutely irregular such that solid contact and bonding together of stacked rolls are precluded despite the aggressively tacky nature of the adhesive coatings that are exposed at the tape edges and are juxtaposed at an interface between contacting rolls.

In the foregoing description the invention has been exemplified with respect to tapes having polyester film backings. However, as previously indicated, the invention is also applicable to the manufacture of tapes having other kinds of semi-rigid films which, when slit with conventional smooth-edged knives, likewise preclude effective hand dispensability, or which in any event make it difficult for inexperienced persons to remove a piece of tape from a roll by finger action alone. Examples of other tape backing films in this category are the semi-rigid tensilized polyvinyl chloride films and polypropylene films. These films, when slit in normal smooth-edged fashion, have a minimum tensile strength of 15,000 p.s.i. and the elongation at break is at least 50%. They are commonly designated as high-tensile high-elongation films. In these films, when a tear has been initiated, the force necessary to continue the tearing action is less than the initiating force. When provided with the present minutely fractured or jagged edge structure, the edge tear can be initiated before pronounced elongation and distortion occurs, the tear commencing at or near the "yield point" of the film as the tension increases.

EXAMPLE

Use is made of a slitting machine (such as a "Cameron" slitter or the like) in which a web of adhesive-coated polyester backing film is drawn from a "jumbo" supply roll through the nip of a gang of rotary slitting knives which bear against a driven score roll. The slitted out tapes are simultaneously wound upon their individual cylindrical cores in whatever length is desired.

A hardened steel score roll having a diameter of 6¼ inches is used. The rotary slitting knives have a diameter of 3 inches. Each knife in a gang is mounted on a ball bearing in an individual adjustable leaf-spring-loaded holder, and the series of holders is held by a supporting crossbar which is parallel to the axis of the score roll. When standard smooth-edged knives are used, each knife bears against the score roll with a pressure in the range of about 10 to 20 pounds when slitting tapes having a backing of polyester film of 1 mil thickness, at a customary running speed of about 200 to 400 feet per minute. But when the microjagged-edged knives of the present invention are employed, it has been found that proper adjustment results in a knife bearing pressure in the range of about 40 to 60 pounds at this same running speed.

A suitable knife is formed from annealed hot rolled steel (such as S.A.E. #52100) and is heat treated and quenched to provide a Rockwell Hardness of C–63–66. This knife (thus see FIG. 3) has an outside blade diameter of 3 inches, a hub diameter of 2 inches (the circular blade thus having a width outside the hub of ½ inch), and an inside diameter (bore) of 0.87 inch. The hub has a thickness of 0.24 inch and the blade a thickness of 0.094 inch. The edge of the blade is sharpened to a 60° included-angle bevel. The extreme peripheral edge of the sharpened blade is slightly rounded by honing so as to enable the edge to bear against the score roll without turning over. Such slitting knives are commercially available and are well known, so further details seem unnecessary.

These conventional sharpened rotary knives are then sandblasted as follows to modify them for purposes of the present invention. The "sand" consists of aluminum oxide (or equivalent) abrasive grits which are hard enough to be capable of being blasted against the edge of a rotating blade to incise the steel and provide the desired minutely-jagged profile. Several knives can be sandblasted at the same time, being mounted on a driven mandrel and slowly rotated, the grits being projected from an oscillating sandblast nozzle under an air pressure of about 100 lbs. per sq. inch, the nozzle being aimed at the edges of the knives and toward the axis. This blasting not only makes an incised microjagged perimeter edge but pits and roughens the sides of the blade down to the hub. (This enables the blade to pick up a greater amount of treating solution from a contacting felt wick when coating of the tape edges, as with an antistatic composition, is performed during slitting.)

Aluminum oxide in the size range of #24 grit to #80 grit can be used, a #50 grit size being generally preferred. Sandblasting is discontinued when a jagged edge has been obtained and further blasting would merely erode and impair this edge. Of course, a workman's skill can only be obtained by experience. The term "microjagged" as herein employed, refers to the dimensional degree of jaggedness possessed by knife edges that have been blasted with grains in approximately this grit size range, and by tape backing film edges formed by slitting with such knives or formed by equivalent means.

Worn knives can be resharpened and again sandblasted to fit them for reuse. As previously noted, these jagged-edged knives can be used longer than smooth-edged knives.

These grit sizes (also called grain sizes) are in accordance with U.S. Department of Commerce Grain Standards for the abrasives industry. They represent standard mixtures of aluminum oxide abrasive grits screened by U.S. Standard Sieves. The size magnitudes of these grits can be visualized from the fact that the control sieve opening is 33 mils for #24 grit, 15 mils for #50 grit, and 8 mils for #80 grit. (For a more detailed explanation, reference may be made to the article on Abrasives, vol. 1, pp. 22–23, Kirk-Othmer Encyclopedia of Chemical Technology, Second Edition: 1963.)

Referring again to FIG. 2, the continuously jagged tape edge shown therein was drawn from a photomicrograph of a pressure-sensitive tape having a polyester film backing of one mil thickness coated with rubber-resin adhesive, which had been slit with knives that had been sandblasted with aluminum oxide abrasive grits of #36 grain size. The jagged edge has about 5 to 10 valleys or incisions per lineal millimeter and the peak-to-valley heights of the jagged profile are mostly in the range of about 10 to 50 microns. This microjagged edge is somewhat rougher than is produced when the preferred grit size (#50) is employed for sandblasting. A much finer edge profile is obtained when #80 grit is used but the knife is definitely jagged-edged and effectively reduces the edge-tear resistance of tapes slit from adhesive-coated polyester films, especially when the film thickness is not over one mil. The jagged profiles of knife edges and tape edges are in all cases plainly evident in 30X photomicrographs.

The coarser the grit (which means the smaller the grit number) employed in sandblasting the splitting knives, the easier it is to tear the adhesive tape product but the rougher the tape edges are and the greater the reduction in elongation (stretch) at break. Hence a grit size in the range of #36 to #50 results in a good balance of properties in the tape product and is preferred.

A preferred polyester film for use in manufacturing adhesive tapes which can be dispensed in conventional manual dispensers, and which are also hand dispensable when slit in accordance with the present invention, is one made by biaxially stretching an extruded film of a non-linear highly polymeric ester of terephthalic acid, ethylene glycol, and a trihydric alcohol (such as glycerol) in the amount of 0.1 to 2.5 mole percent based on the terephthalic acid. Typically, the film is stretched by a factor of three times (3X) in both the machine direction and the crosswise direction. For further details, reference may be made to the copending application of Lockwood and Agre, Serial Number 245,977, since issued as U.S. Patent No. 3,251,809 on May 17, 1966.

The polyester film can be primed on one face with an ultraviolet-radiation-anchored butadiene-styrene rubbery copolymer. (Thus see U.S. Patent of Charbonneau and Abere, No. 3,188,266, issued June 8, 1965.) The primed side of the film can then be coated with a conventional rubber-resin type of pressure-sensitive, e.g., a blend of 100 parts rubber and 75 parts by weight, of polyterpene tackifying resin of 115° C. melting point (such as "Piccolyte S–115" of Pennsylvania Industrial Chem. Corp.). The film can be provided with a low-adhesion backsize coating so as to reduce the force needed to unwind rolls of the adhesive sheeting and the ultimate adhesive tape rolls. Such backsize coatings are described in U.S. Patents 2,532,011 (Nov. 28, 1950) and 2,607,711 (Aug. 19, 1952). Wide adhesive coated film in "jumbo" roll form is slit and wound into rolls of desired width and length for sale as previously described above. Films coated with any of the known pressure-sensitive tape adhesives can be utilized. These include not only mixtures of natural or synthetic rubbers and tackifier resins, but rubbery polymers which are inherently tacky such as the polyether and polyacrylate pressure-sensitive adhesives.

Pressure-sensitive adhesive tape manufactured in the same way (using the Lockwood and Agre type of film) but which has been slit by use of conventional smooth-edged rotary knives, can be readily dispensed in manual dispensers of the well-known type which have a serrated blade against which a piece of tape can be torn off, the tape being held between thumb and forefinger. The serrated blade initiates the cross tear at the edge of the tape and, once started, the tear is easily continued with this kind of film. However, unlike the present adhesive tape, such smooth-edged tape is not "hand dispensable" and hence does not meet the need of a workman who wishes to tear off a piece of tape from a roll solely by finger action without employing any tool or dispenser.

Use can also be made of conventional polyester film backings to provide adhesive tapes which are too tough to be dispensed in the manual serrated-blade dispenser, but which are capable of being torn across by finger action after a tear has been initiated by finger action at the microjagged edge of the tape and which are therefore "hand dispensable". Thus use can be made of Du Pont's "Mylar" polyester film, and the like, in one to two mil thickness. This polyethylene/terephthalate film is tensilized (oriented) in only the machine direction. A wide width film web can be primed, backsized, coated with pressure-sensitive adhesive, and slit from a jumbo roll to provide tape rolls, in accordance with the previous description.

An illustration of an industrially important field of use for such hand dispensable pressure-sensitive adhesive tape is provided by a "riveter's tape." In this case a pigmented pressure-sensitive adhesive is applied to one mil polyester film in stripes one-half inch wide which are spaced apart by one-half inch. The jumbo roll is slit in such a way as to provide rolls of tape one inch wide carrying a one-fourth inch wide stripe of adhesive along each side, the central portion of the tape thus being non-adhesive and transparent. The adhesive is pigmented so as to provide stripes that are opaque and colored (i.e., green colored) to facilitate positioning on the work area and to indicate the presence of the tape and the fact of subsequent removal.

This tape is applied over a row of heads of rivets that have been inserted in an aluminum fuselage or wing section of an airplane during fabrication. This permits the rivets to be successively headed by a riveting hammer without jiggling out of place due to vibration. The non-adhesive portion of the tape contacts the rivet heads and is tough enough to retain integrity, enabling the tape to be readily pulled off after completion of the riveting without leaving a residue and without marring the aluminum surfaces. In applying the tape from a roll, the workman adheres the end of the tape to the panel with one hand and unrolls a suitable length by moving his other hand which holds the roll, guiding and pressing down the tape with his first hand so as to cover the rivet heads and adhere the tape to the panel, and he then uses his fingers to tear off the end of the piece of tape. It is an obvious advantage that this tough polyester film-backed "riveter's tape," which is aggressively tacky, can be readily hand dispensed in this manner, directly from a tape roll.

A further example of an industrially important field of use is in providing a tough strong film-backed pressure-sensitive adhesive tape which can compete with finger-tearable cloth-backed adhesive tapes. In this case use is made of a tensilized polyester film of 1½ to 2 mil thickness which is fully coated on the face side with an aggressively-tacky rubber-resin adhesive. Such tape is too tough to be hand dispensable when slit with the customary smooth-edged knives. But when slit using sandblasted knives, as above described, rolls of microjagged-edged tape having good hand dispensability can be manufactured.

We claim:
1. A roll of pressure-sensitive adhesive tape wound upon itself, comprised of a flexible semi-rigid high-tensile high-elongation backing film having a thickness of about 1 to 2 mils, coated with a tacky rubbery pressure-sensitive adhesive, which tape would not be readily finger tearable if the backing film were smooth-edged, characterized by the feature that said tape backing film has inconspicuous continuously microjagged edges capable of being readily torn by finger action whereby the tape is rendered hand dispensable, said edges having been formed by slitting the tape from a web by means of microjagged-edged rotary slitting knives substantially as herein described.

2. A roll of hand dispensable adhesive tape according to claim 1 wherein the backing film is a tensilized polyester film whose microjagged edges have been formed by use of rotary slitting knives having sharpened blade edges grit-incised to a microjagged condition by sandblasting with abrasive grits in the size range of about #24 to #80.

3. A normally tacky and pressure-sensitive adhesive tape wound upon itself in roll form, which comprises a backing of biaxially oriented thermoplastic film, and a layer of normally tacky and pressure-sensitive adhesive on one side of the backing, the film is provided with a continuous series of minute micro-jagged irregularities formed along each edge thereof which are not visible to the naked eye to permit ready tearing of the tape in a transverse direction.

References Cited
UNITED STATES PATENTS

| | | | |
|---|---|---|---|
| 2,508,855 | 5/1950 | Brown | 206—56 |
| 2,779,526 | 1/1957 | Vogt | 206—65 |
| 3,241,662 | 3/1966 | Robinson et al. | 206—59 |

WILLIAM T. DIXSON, Jr., Primary Examiner

U.S. Cl. X.R.
206—56